Sept. 2, 1930. T. DI TELLA 1,774,790
LIQUID DISPENSING APPARATUS
Filed April 4, 1928 3 Sheets-Sheet 1

Inventor·
Torcuato Di Tella
By Emil Bönnelycke
Attorney

Sept. 2, 1930. T. DI TELLA 1,774,790
LIQUID DISPENSING APPARATUS
Filed April 4, 1928 3 Sheets-Sheet 3
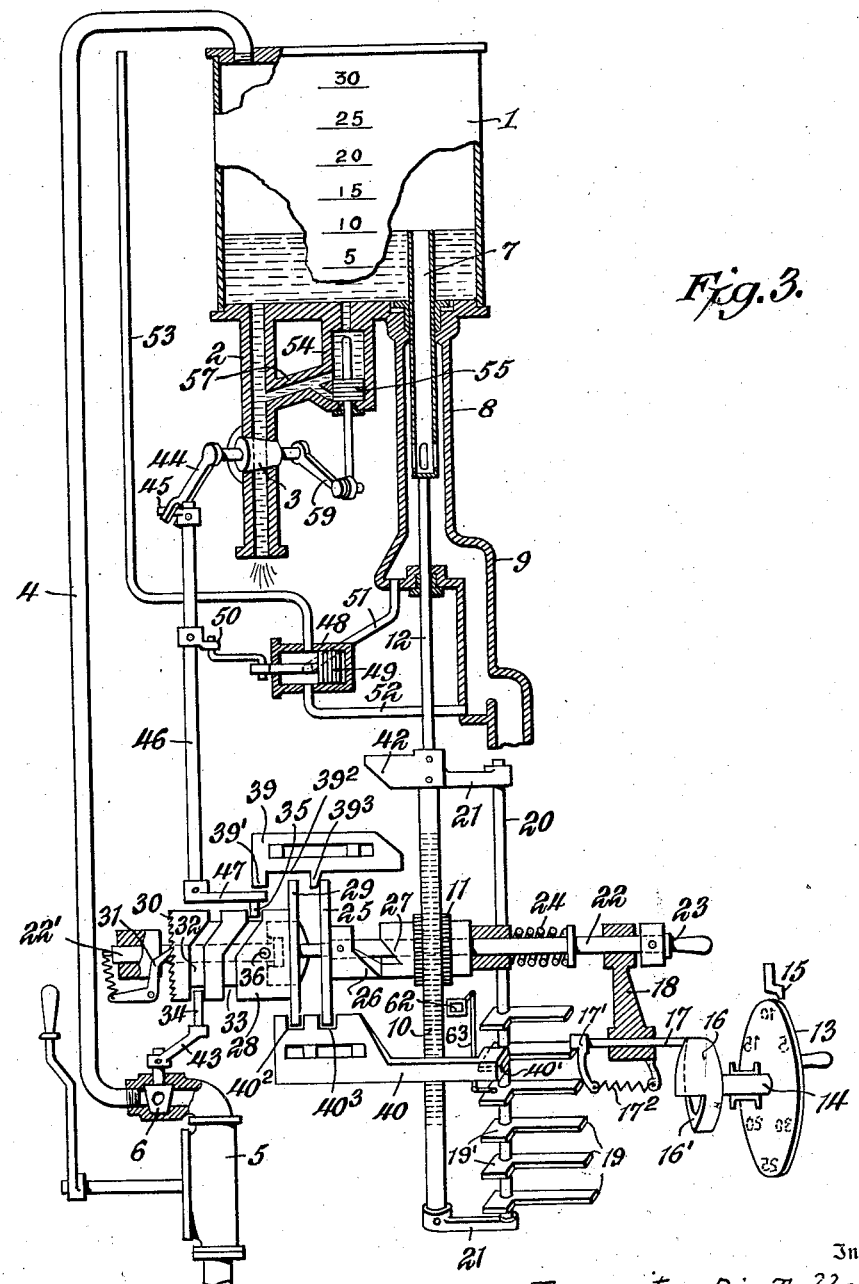
Fig.3.
Inventor
Torcuato Di Tella
By
Attorney Patented Sept. 2, 1930

1,774,790

UNITED STATES PATENT OFFICE

TORCUATO DI TELLA, OF BUENOS AIRES, ARGENTINA

LIQUID-DISPENSING APPARATUS

Application filed April 4, 1928, Serial No. 267,423, and in Great Britain February 1, 1928.

This invention relates to apparatus for measuring and dispensing liquids in predetermined quantities, and it has special reference to apparatus of the type shown and described in my prior application, Serial No. 142,499, filed October 18, 1926.

The object of the invention is to improve generally the construction of my earlier form of apparatus so as to insure the discharge of the precise quantity of liquid for which the mechanism has been set, and to prevent fraudulent operation by either premature or delayed opening or closing of the controlling valves. In particular, the present invention involves the provision of hydraulic locks in connection with certain parts of the apparatus and, also, an improved system of controls whereby the operation of the moving parts in general is governed. These features and improvements, as well as others comprised in the invention, will be described at length in the course of the following description.

Figure 1:
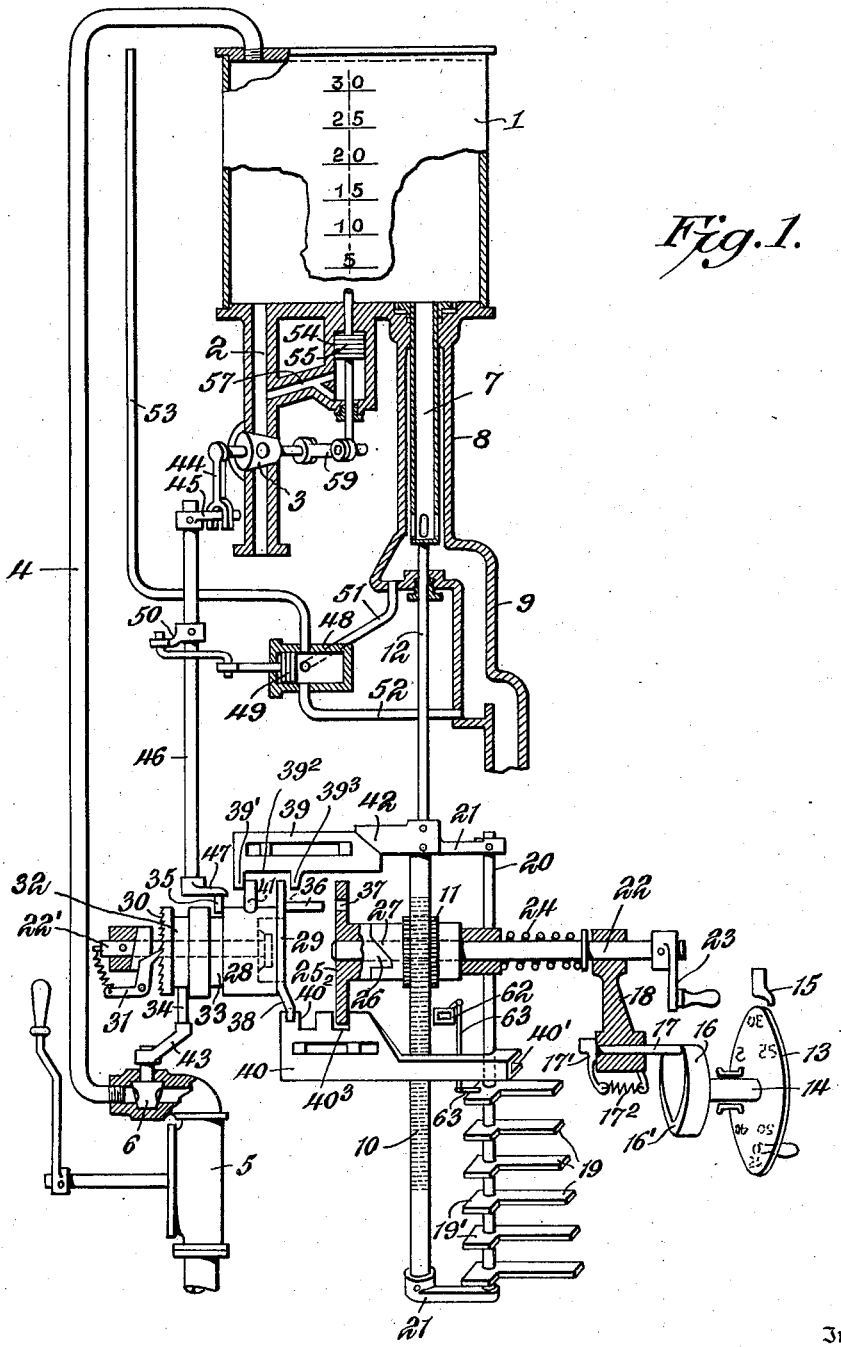
Figure 2:
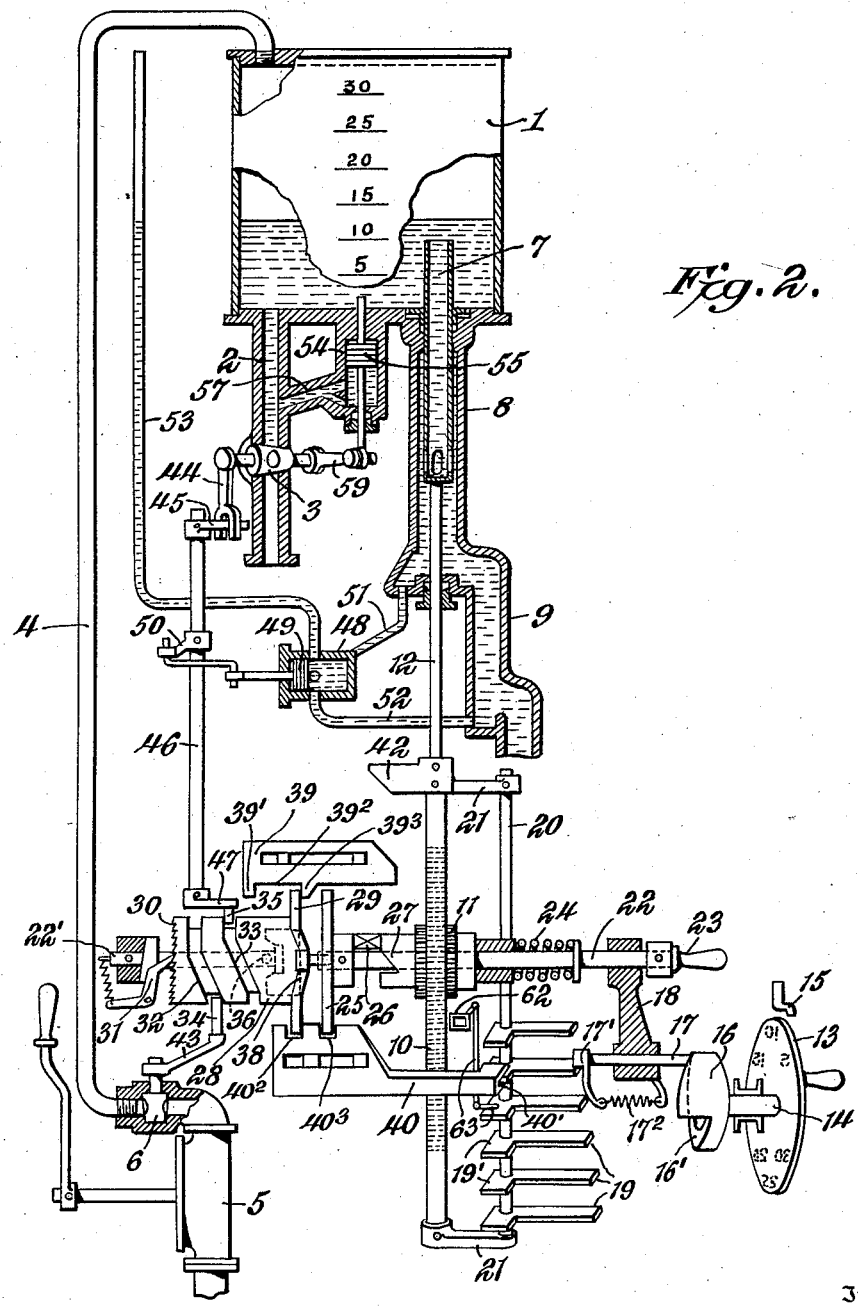

In the accompanying drawings, Figure 1 is a side view, partly in section, showing the apparatus in its normal condition, with the dispensing vessel empty; Fig. 2 is a view of similar character but showing the apparatus after the indicating mechanism has been set and overflow of excess liquid supplied to the dispensing vessel has commenced; Fig. 3 is also a view of similar character but showing the position of the parts after the discharge of the liquid from the dispensing vessel has begun.

The form of apparatus illustrated is at present considered preferred, but it will be understood that the invention is not limited to the precise details thereof.

Referring more particularly to the drawing, 1 indicates a transparent measuring and dispensing vessel, fitted at its bottom with a discharge pipe 2 in which an outlet valve 3 (preferably of the rotary plug type) is mounted. The vessel is supplied with gasolene or other liquid from a main reservoir or storage tank (not shown) by a feed or delivery pipe 4, the upper end of which overhangs and projects into said vessel; the said wall of the vessel having graduations marked thereon at different heights or levels to indicate different quantities of liquid to be dispensed. The liquid is forced through the feed pipe to the dispensing vessel by means of a pump 5, operated manually or otherwise, and its flow is controlled by an inlet valve 6 mounted in the pipe at a point slightly above the pump.

The level of the liquid in the dispensing vessel is controlled by a vertically-adjustable overflow pipe 7, which is raised and lowered by mechanism subsequently described; said pipe normally occupying its zero position, in which its upper end is disposed substantially flush with the bottom of the vessel. This pipe is arranged within a tubular guide 8 which forms part of a return pipe 9 leading back to the main tank or reservoir, and it passes through the bottom of the dispensing vessel in a manner to form a liquid-tight joint. Due to this arrangement, and assuming that the overflow pipe 7 has been set at the proper height to correspond to the amount of liquid to be dispensed—10 liters in the case of Figs. 2 and 3—the liquid supplied to the vessel in excess of that amount will run off into and through the pipe and then into the return pipe 9 which delivers it to the tank.

The position of the overflow pipe is adjusted by means of a suitable mechanism embodying a vertical rack 10 operated by a pinion 11 and connected to the lower end of the pipe by an intermediate rod 12; the movement of the rack being controlled by an associated setting and indicating device. This device consists of a graduated disk 13 mounted on one end of a short horizontal shaft 14 which is rotated by turning disk 13 or in any other desired way, the extent of rotation being determined by a pointer or indicator 15 which coacts with the setting disk. A second disk 16 is fixed to the opposite end of the shaft and is provided with a cam 16' for adjustable engagement with the adjacent end of a plunger or finger 17 slidably mounted in a stationary bearing 18; the other end of the plunger having a projection or head 17' which is selectively engaged by a set of stops 19, of which there is one for each of the different quantities of liquid to be dispensed. These stops 19 are mounted in superposed relation (preferably, in an adjustable manner so that their positions can be changed) on a vertical rod 20 which is fastened parallel to rack 10 by top and bottom cross-pieces 21; and they are arranged stepwise in increasing lengths, from the topmost to the bottommost, as shown.

The plunger or stop 17 is pressed against the cam disk 16 by a spring $17^2$ and the cam 16' on said disk is of variable height, according to the different amounts of liquid to be dispensed, so that by adjusting the setting disk 13 for the proper amount the plunger stop will be moved into a position in which its head 17' will lie in the path of the adjacent end of the corresponding stop 19 to be struck thereby when the rack 10 and its associated set of stops are raised. The movement of the rack is thereupon arrested.

Rotation of pinion 11 is effected by means of a horizontal shaft 22 whereon it is loosely mounted, means being provided for automatically coupling and uncoupling the pinion and shaft at the proper times. Shaft 22 carries a handle 23 at one end for rotating it, and it is mounted for endwise movement against the action of a spring 24 which tends to force it outward or to the right, as hereinafter explained. To couple the pinion to the shaft, the latter has fixed to it a disk 25 provided on one face with a clutch member or tooth 26 which is designed for periodic engagement with a complemental clutch member 27 secured to the pinion; the spring 24 acting to maintain this engagement. While such engagement is in force, the rotation of disk 25 by shaft 22 will be transmitted to the pinion, and the latter will be driven and, in turn, will raise the rack and, hence, the overflow pipe. The stops 19 move upward with the rack until the one corresponding to the amount for which the indicating device has been set strikes against the plunger head 17', the stops above that one clearing said head as they move past it. This terminates the movement of the rack, which is thus held stationary and, in turn, locks the pinion against rotation. The latter then offers a resistance to the further rotation of shaft 22 (which can be regarded as the main or operating shaft); and when this resistance is overcome, the continued engagement of clutch parts 26 and 27 will force disk 25 and its shaft 22 in a direction away from pinion 11.

The opening and closing movements of the valves 3 and 6, as well as the operation of certain other parts and devices hereinafter described, are governed by a controller 28, here shown as constituted by a cylinder loosely mounted on a short shaft 22' which alines with shaft 22. This cylinder is provided at the end adjacent disk 25 with a rib 29, and at the other end with a set of ratchet teeth 30 engaged by a spring-actuated check pawl 31, while the intermediate portion of its circumferential wall has two cam grooves or tracks 32 and 33 formed therein and receiving studs 34 and 35. Rotation of the cylinder is effected by coupling it to disk 25 at the proper times, by means of a lateral pin 36 on the cylinder engaging in an opening 37 (Fig. 1) in the disk; such engagement being obtained when disk 25 is cammed backward by the parts 26, 27.

The rib 29 on the controller cylinder is cut away at 38 to provide a space or gap, and at the opposite sides of this gap the rib is bent laterally, which gives it a somewhat spiral or cam-like appearance at this point. The rib coacts with upper and lower horizontal slides 39 and 40 provided at wide intervals with relatively-large vertical teeth, one tooth 39' on the upper slide 39 being designed to be struck by a projection or lug 41 on the cylinder, the rotation of which is thereby stopped. Both slides are guided and supported to their endwise movements in suitable manner, the lower slide 40 being so arranged as to travel through the rib gap 38 at the proper times. Slide 40 extends toward the movable series of stops 19 and is provided at the end adjacent thereto with a forked or slotted head 40' for interchangeable engagement with the teeth or projections 19' on said stops, so that an interlock is thus formed between the particular stop 19 in action and the slide. The upper slide 39 extends toward a laterally-projecting arm 42 fixed to the upper end of rack 10, the confronting ends of these two parts being beveled or inclined reversely to each other, so as to force or cam the slide backward or to the left when the rack is about to complete its descent, after said slide has been shifted to the right by the passage of the cam part 38 of the rib 29 through the tooth space $39^2$ to the right of tooth 39'. This movement, however, will be more fully described later.

Reverting to the operation, and commencing at the point where the controller cylinder 28 is coupled to the clutch disk 25 and starts to rotate, it will be seen from Fig. 1 that the gap 38 in the rib 29 straddles the lower slide 40, which latter will immediately be shifted to the left by the travel of the cam or spiral part of the rib through the first tooth space $40^2$ in the slide and will engage its slotted head 40' with the locking tooth 19' on the stop 19 which happens to have been selected, thereby making doubly sure that the position of the overflow tube 7 cannot be changed and, at the same time, completing the interlock between the clutch disk 25 and the controller which was initiated by the shifting movement of said disk produced by the action of the interengaging parts 26 and 27. This completion of the interlock is due to the fact that the disk 25 projects slightly into a second tooth space $40^3$ in slide 40, so that the two parts 25 and 40 must, therefore, move in unison; this being equally true, of course, for the afore-mentioned initial leftward movement of the disk.

Now, the rib 29 is straight, except for its gapped cam portion 38, so that the continued rotation of the controller cylinder 28 produces no change in the position of slide 40 until just before the cylinder completes a revolution. The upper slide 39 is formed with a second tooth $39^3$, between which and the tooth 39' the tooth space $39^2$ is located; and in the normal position of the parts, the projection or lug 41 on the cylinder is in line with space $39^2$ while rib 29 also projects into said space (Fig. 1). Consequently, there is nothing to obstruct the rotation of the cylinder nor change the position of the slide until the cam part 38 of the rib reaches the tooth $39^3$ and shifts the slide to the right, which it is then free to do since lug 41 is in line with space $39^2$ and arm 42 has moved upward with rack 10 by that time. The shifting movement, however, brings tooth 39' into line with lug 41, so that when the cylinder completes its revolution the parts 41 and 39' will contact and the rotation of the cylinder is thereby terminated. But before that occurs, the cam part 38 of rib 29 will have shifted slide 40 a distance to the right equal to its previous movement to the left, and at the conclusion thereof the gap 38 will again intersect the tooth space $40^2$ in the slide, the movement of the latter disengaging its head 40' from the active stop 19 and unlocking the rack. Shaft 22 must then be turned counter-clockwise through one revolution (since it is held against clockwise motion by the inter-engaged parts 39' and 41) in order to return the mechanism to its original position.

When slide 40 is shifted to the right by the cam rib 29, as above explained, it carries the clutch disk 25 with it, due to the engagement of the latter in tooth space $40^2$; but this movement is not great enough to withdraw said disk from the controller pin 36, that being effected by spring 24 which acts directly on shaft 22 and forces it further to the right, thereby uncoupling the disk completely from the controller and, at the same time, effecting a similar movement of slide 40. The counter-clockwise movement of shaft 22 is then commenced; and since the rightward movement of the clutch disk will have the effect of coupling it to pinion 11, due to the re-engagement of the parts 26 and 27, said pinion will be driven in a direction to lower the rack and, with it, the overflow pipe 7. At the conclusion of the downward movement of the rack, its arm 42 hits against the beveled end of slide 39, producing a camming action which forces the slide back and thereby brings its tooth space $39^2$ into line with lug 41, so that the controller is thus unlocked for the next cycle of operations.

The foregoing description relates mainly to the locking and unlocking of the various devices comprised in the apparatus, and to the control in general. As to the inlet or delivery valve 6 and the outlet or discharge valve 3, these are likewise actuated automatically under the control of cylinder 28. The inlet valve 6 has connected to its stem a crank arm 43 which carries the stud 34 that operates in the cam track 32 in the controller cylinder, while the outlet valve 3 has a suitable crank connection 44 with a crank arm 45 secured to a vertical rock shaft 46, to the lower end of which is fixed another arm 47, the latter carrying the stud 35 that works in the cam track 33. The crank 43 is actuated shortly after the cylinder has commenced to rotate, at which time the adjustment of the overflow pipe 7 will have been completed, such action effecting the opening of valve 6, whereupon the liquid can be pumped through feed pipe 4 into vessel 1. The outlet valve 3 is normally closed and maintains that position until after the feeding has ended, while the inlet valve is kept open for the proper time by the shape of track 32 and thereafter is returned to closed position.

It has already been explained that a quantity of liquid greater than that to be dispensed is supplied to vessel 1, the excess liquid escaping through the overflow pipe 7 and the return pipe 8—9. If it were possible to close the inlet valve and open the outlet valve before the proper level is established in said vessel, more liquid would be discharged than called for, and to avoid this an hydraulic lock is provided which prevents the outlet valve from being opened prematurely. This locking device, which forms the subject of my companion application, No. 267,242, filed of even date herewith, consists of a cylinder 48 containing a piston 49, the rod of which is connected to a crank arm 50 secured to rock shaft 46 between arms 45 and 47. The cylinder 48 is supplied with liquid from the return pipe 9 by a pipe 51 and exhausted by a pipe 52 which leads back to pipe 9. Pipe 52, however, is designed to carry off the liquid more slowly than it is supplied by pipe 51, so that cylinder 48 will fill very rapidly and the liquid in front of piston 49 will be trapped and will prevent the piston from moving, the air being forced out of the cylinder through a vent pipe 53 as the liquid enters. The piston lock, in turn, reacts on shaft 46 and holds it against movement; this condition being maintained until overflow has ended and cylinder 48 has been drained through pipe 52.

It will be understood, of course, that rock shaft 46 is not actuated until after the inlet valve 6 has been opened and closed, the relative timing of the operations depending on the shapes of the cam tracks 32 and 33. In any case, the outlet valve cannot be opened until the hydraulic lock cylinder 48 has been emptied, thereby permitting movement of the lock piston. When this takes place, shaft 46 is rocked, and its arm 45 opens the valve, whereupon the liquid is discharged through pipe 2.

Once discharge commences, the outlet valve 3 must be kept open until it has ended; and to effect this, a second hydraulic lock is provided which likewise comprises a cylinder 54 and a piston 55 working therein. Cylinder 54 is supplied with liquid from pipe 2 at a point above the normally closed valve 3 by a pipe 57; the trapped liquid locking piston 55 in its outer position until emptied back through pipe 57 when the valve is opened. The movements of piston 55 are effected by a crank arm 59 secured to the adjacent end of the stem of valve 3 and pivotally connected to the lower end of the rod of said piston, so that the movement of the valve by the parts 46, 45, 44 will thus be transmitted to the piston.

In the normal position of parts, represented in Fig. 1, both valves 3 and 6 are closed, and piston 55 occupies its upper or inner position in cylinder 54. The setting mechanism is then adjusted and actuated, thereby positioning the rack 10 and related parts, including the overflow pipe 7, while at the same time opening the inlet valve 6, whereupon pump 5 is operated to supply liquid through pipe 4 to the dispensing vessel 1. The latter continues to fill until overflow takes place through pipe 7, some of the liquid from the vessel passing through pipes 2 and 57 into cylinder 54. When all the excess liquid in the vessel has run off through the return piping to the storage reservoir or tank, the hydraulic lock cylinder empties through pipe 52 to the return piping and thereby unlocks piston 49 and, hence, the rock shaft 46, with the result that said shaft can then be turned by the controller through a reverse movement which opens the outlet valve 3. This same movement brings piston 55 into its lower or outer position (Fig. 3) in which it is locked against upward movement and thereby keeps valve 3 open until all the liquid has been discharged from vessel 1. The concluding portion of the movement of the controller then restores the valves to initial position.

If desired, the various amounts of liquid dispensed can be registered and totaled; a suitable counting or registering mechanism 62 being provided for that purpose. This mechanism may be operated automatically in any desired manner as, for instance, by a rocking lever system 63 arranged in the path of the stops 19 so as to be engaged and actuated by each stop as it passes thereby.

I claim as my invention:—

1. Liquid dispensing apparatus, comprising a dispensing vessel provided with an outlet valve; an overflow pipe movable in said vessel to different definite heights; means for raising and lowering said pipe; and means for locking the outlet valve in closed position during the continuance of the overflow.

2. Liquid dispensing apparatus, comprising a dispensing vessel provided with an outlet valve; an overflow pipe movable in said vessel to different definite heights; means for setting said pipe; and a hydraulic lock acting to hold the outlet valve in closed position during the continuance of the overflow.

3. Liquid dispensing apparatus, comprising a dispensing vessel provided with an outlet valve; an overflow pipe movable in said vessel to different definite heights; means for setting said pipe; means for locking the pipe in set position; and means for locking the outlet valve in closed position during the continuance of the overflow.

4. Liquid dispensing apparatus, comprising a dispensing vessel provided with an outlet valve; an overflow pipe movable in said vessel to different definite heights; means for setting said pipe; means for locking the pipe in set position; means for locking the outlet valve in closed position during the continuance of the overflow; and a device common to both locks for determining their activity.

5. Liquid dispensing apparatus, comprising a dispensing vessel; an inlet valve and an outlet valve connected with said vessel to determine its supply and discharge of liquid; an overflow pipe movable in said vessel to different definite heights; means for setting said pipe; a lock acting to hold the inlet valve in closed position until said pipe has been set; and a separate lock acting to hold the outlet valve closed during the continuance of the overflow.

6. Dispensing apparatus, according to claim 5, in which both locks have a common controller.

7. Dispensing apparatus, according to claim 5, in which a lock is provided for holding the overflow pipe in set position, and in which a common controller is provided for all three locks.

8. Liquid dispensing apparatus, comprising a dispensing vessel; an inlet valve and an outlet valve connected with said vessel to determine its supply and discharge of liquid; an overflow pipe movable in said vessel to different definite heights; means for setting said pipe; a lock acting to hold the inlet valve in closed position until said pipe has been set; a separate lock acting to hold the outlet valve closed during the continuance of the overflow; and a rotary controller associated with both locks to govern their activity.

9. Dispensing apparatus, according to claim 8, in which the rotary controller is provided with a separate cam track for each valve, and a separate connection between said controller and each valve embodying an element mounted to travel along the respective track.

10. Liquid dispensing apparatus, comprising a dispensing vessel provided with a valved outlet; an overflow pipe movable in the vessel to different definite heights; mechanism for setting said pipe, embodying a vertically-movable series of superposed stops and an element settable to engage a selected stop and thereby arrest the movement of the stops; and locking means acting automatically to engage the selected stop and hold it in arrested position.

11. Liquid dispensing apparatus, comprising a dispensing vessel provided with a valved outlet; an overflow pipe movable in the vessel to different definite heights; and mechanism for setting said pipe, embodying a vertical rack connected to the pipe, a pinion to move the same, a vertical series of stops connected to said rack to move therewith as a unit, and an element settable to engage a selected stop during the upward movement of the rack and thereby arrest such movement.

12. Liquid dispensing apparatus, comprising a dispensing vessel provided with a valved outlet; an overflow pipe movable in the vessel to different definite heights; mechanism for setting said pipe, embodying a vertical rack connected to the pipe, a pinion to move the same, a vertical series of stops connected to said rack to move therewith as a unit, and an element settable to engage a selected stop during the upward movement of the rack and thereby arrest such movement; and locking means acting automatically to engage the selected stop and hold it in arrested position.

13. Liquid dispensing apparatus, comprising a dispensing vessel provided with an outlet valve and a vertically-adjustable overflow device; setting means for said device; operating means for opening and closing said valve; and means activated by the overflow during its continuance for locking said operating means against valve-opening movement.

14. Liquid dispensing apparatus, comprising a dispensing vessel provided with an outlet valve and a vertically-adjustable overflow device; setting means for said device; operating means for opening and closing said valve; means activated by the overflow during its continuance for locking said operating means against valve-opening movement; and separate means activated by the discharge during its continuance for locking said operating means against valve-closing movement.

15. Liquid dispensing apparatus, according to claim 14, in which at least one locking means embodies a cylinder supplied with the liquid from the dispensing vessel, and a plunger in the cylinder controlled by the liquid therein.

16. Liquid dispensing apparatus, comprising a dispensing vessel provided with an outlet valve and with an overflow device; operating means for opening and closing said valve; and means activated by the overflow during its continuance for locking said operating means against valve-opening movement.

17. Liquid dispensing apparatus, comprising a dispensing vessel provided with an outlet valve and with an overflow device; operating means for opening and closing said valve; means activated by the overflow during its continuance for locking said operating means against valve-opening movement; and separate means activated by the discharge during its continuance for locking said operating means against valve-closing movement.

In testimony whereof I affix my signature.

TORCUATO DI TELLA.